July 10, 1956  M. J. ECKROAD  2,754,129
VERTICALLY ADJUSTABLE TRAILER
Filed Jan. 5, 1955  2 Sheets-Sheet 1

INVENTOR.
Maurice J. Eckroad
BY
Frease & Bishop
ATTORNEYS

July 10, 1956          M. J. ECKROAD          2,754,129
VERTICALLY ADJUSTABLE TRAILER
Filed Jan. 5, 1955          2 Sheets-Sheet 2
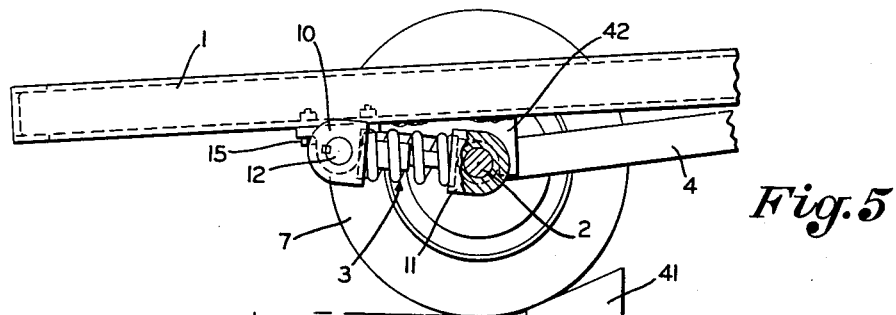
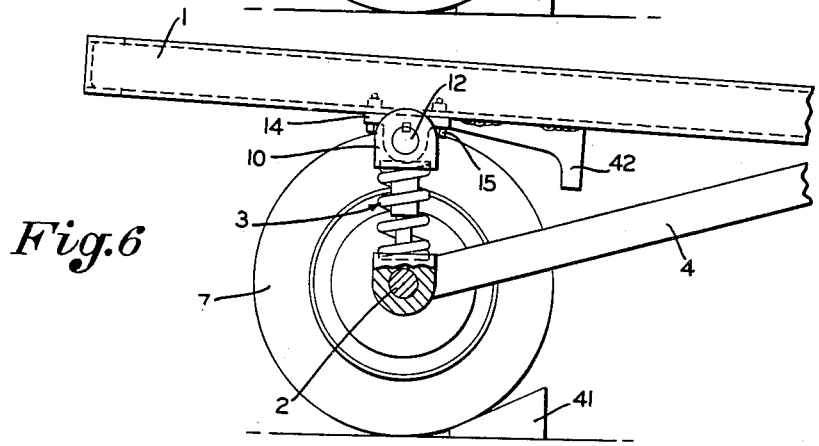
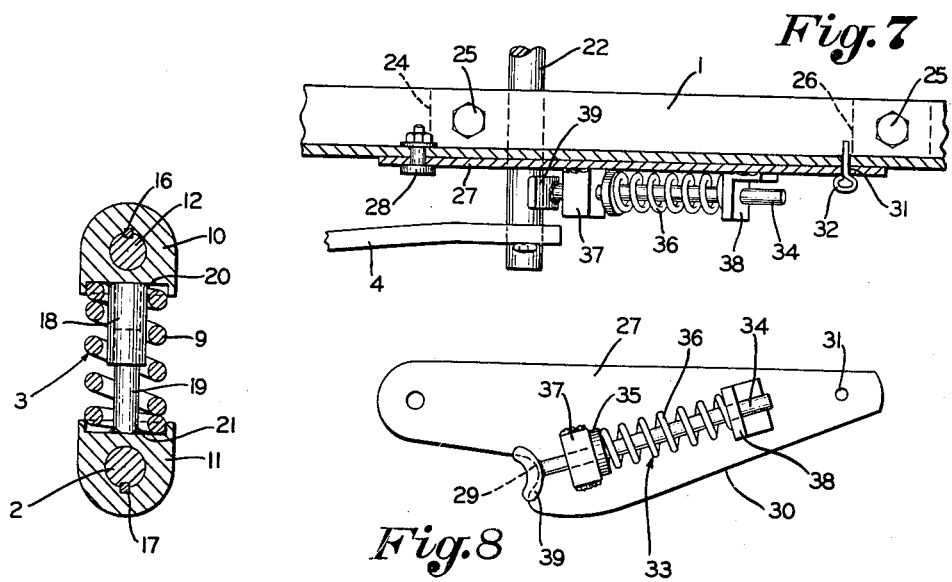
INVENTOR.
Maurice J. Eckroad
BY
Frease & Bishop
ATTORNEYS

United States Patent Office 2,754,129
Patented July 10, 1956

2,754,129

VERTICALLY ADJUSTABLE TRAILER

Maurice J. Eckroad, Navarre, Ohio

Application January 5, 1955, Serial No. 479,961

2 Claims. (Cl. 280—44)

This invention relates to a vehicle suspension and more particularly to suspension means for trailer frames.

A difficulty with prior automobile trailers has been the relative difficulty of loading and unloading bulky or heavy objects. Some trailers have been constructed with relatively low frames. However, they are not satisfactory for fast hauling because they are too close to the road.

Another type of trailer has been constructed by which the trailer frame is used as a lever for raising the object to hauling level from a lower loading level. The disadvantage of such trailers is that human effort must be used to manipulate the loaded trailer into hauling position.

Accordingly, it is the primary object of this invention to provide a trailer that may be raised or lowered for loading or unloading heavy or bulky objects from the trailer without human effort.

More specifically, it is an object of this invention to provide a trailer frame that may be raised or lowered for loading or unloading purposes by the use of the towing vehicle.

Another object of this invention is to provide a trailer suspension mechanism which is entirely flexible under the weight of a loaded trailer.

Another object of this invention is to provide a new apparatus which avoids disadvantages and limitations of prior trailers and which is simple and inexpensive in construction.

These and other objects and advantages apparent to those skilled in the art from the following description and claims may be attained, the stated results achieved, and the described difficulties overcome, by the discoveries, principles, apparatus, parts, combinations, subcombinations and elements which comprise the present invention, the nature of which is set forth in the following statement, preferred embodiments of which—illustrative of the best mode in which applicant has contemplated applying the principles—are set forth in the following description, and which is particularly and distinctly pointed out and set forth in the appended claims forming part hereof.

By way of example, preferred embodiments of the apparatus of the present invention are illustrated in the accompanying drawings forming part hereof, in which similar numerals refer to similar parts throughout the various figures of the drawings, wherein:

Fig. 5 is an enlarged fragmentary elevational view, partly in section, showing another embodiment of the present invention;

Fig. 6 is an elevational view similar to that of Fig. 5, showing the trailer frame in the raised position with respect to the axle;

Fig. 7 is an enlarged, fragmentary, horizontal, sectional view taken on the line 7—7 of Fig. 3;

Fig. 8 is an enlarged elevational view of the latch plate by which the trailer frame is locked in the elevated position; and Fig. 9 is an enlarged sectional view of the spring suspension means by which the trailer frame is mounted on the axle.

Figure 1:
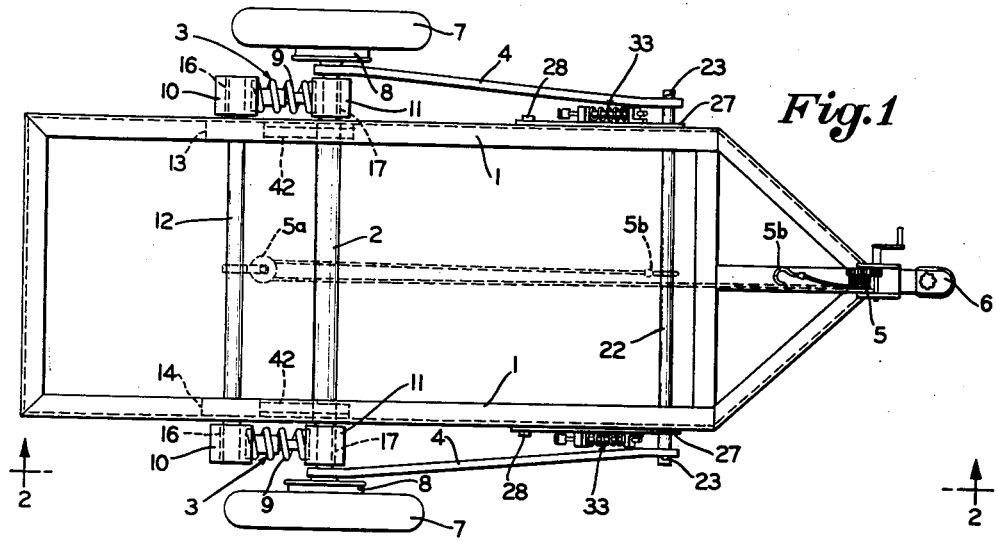
Fig. 1 is a plan view of one embodiment of the trailer.

One embodiment of the invention, as shown in Fig. 1, includes a trailer frame 1, an axle 2, resilient suspension mechanisms generally indicated at 3, a pair of radius or connecting rods 4, a winch 5, and a socket 6 for use with a ball joint on an automobile (not shown).

The frame 1 is preferably rectangular in shape and is composed of channel members, though other shapes and members may be used. For descriptive purposes, the end of the trailer at which the winch 5 is disposed is designated as the forward end thereof.

Beneath the frame 1 is the axle 2 having wheels 7 rotatably mounted at opposite ends. Each wheel 7 is provided with a brake 8 which is secured to the axle 2 and which is operated either electrically or hydraulically preferably by controls located in the automobile towing the trailer.

The axle 2 is mounted by similar resilient or suspension mechanisms 3 near opposite ends of the axle. Each suspension means or mechanism 3 includes a coil spring 9 having opposite ends secured to shackles 10 and 11. The shackles 10 of both suspension mechanisms 3 are secured to opposite ends of a shaft 12 which is rotatably secured to the undersurface of the frame 1 by a pair of journals 13 and 14 attached to the frame by bolts 15. Both pairs of shackles 10 and 11, the shaft 12, and the axle 2 are secured against rotation by keys 16 and 17 respectively, as more clearly shown in Fig. 9.

In addition, the suspension mechanisms 3 include rigidizing members having a sleeve 18 and a stub shaft 19 which are telescopically disposed and which have opposite ends rigidly secured to the shackles 10 and 11 in a conventional manner, such as by welds 20 and 21, respectively. As shown in the drawing, the sleeve 18 and shaft 19 are preferably mounted within the coil springs 9. The purpose of the sleeve 18 and shaft 19 is to provide lateral rigidity to the springs 9 when the suspension mechanisms 3 are rotated about the shaft 12 without reducing the resiliency of the springs 9. That is, when the trailer frame is raised or lowered between the positions shown in Figs. 2 and 3, the sleeve 18 and shaft 19 absorb the rotational or lateral forces transmitted through the suspension mechanisms 3, thereby preventing the coil springs 9 from becoming displaced from between the shackles 10 and 11. Where the trailer is for relatively heavy duty work, the sleeve 18 and shaft 19 may be parts of a hydraulic shock absorber.

Figure 2:
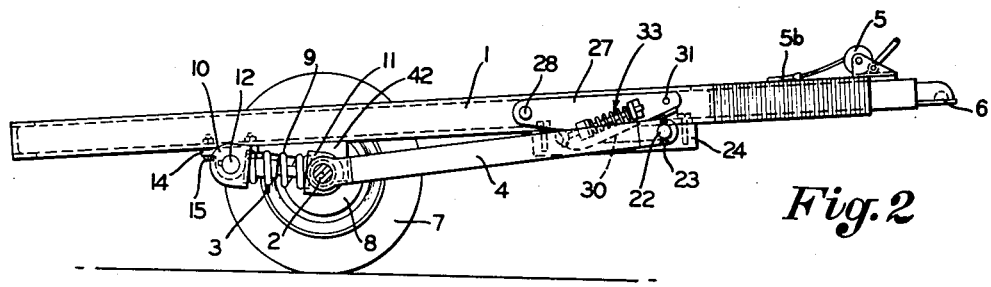
Fig. 2 is an elevational view, partly in section, taken on the line 2—2 of Fig. 1.
Figure 3:
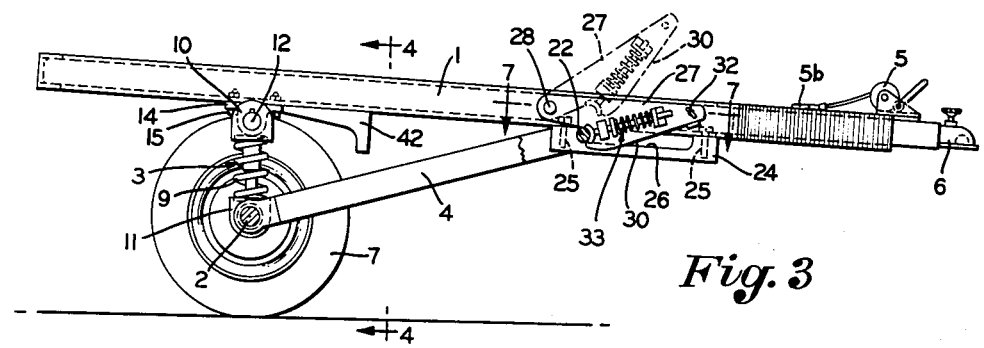
Fig. 3 is an elevational view, partly in section, taken at the same location as Fig. 2, and showing the trailer frame in the raised position with respect to the axle.
Figure 4:
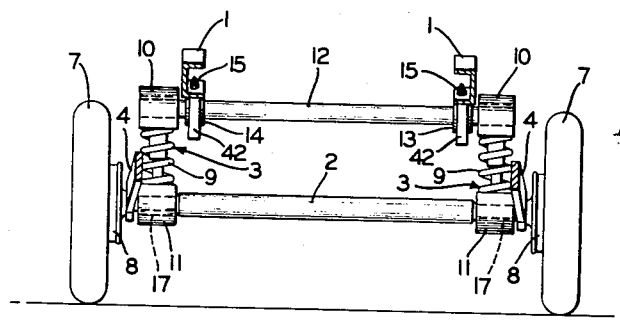
Fig. 4 is a transverse sectional view taken on the line 4—4 of Fig. 3.

One end of each connecting rod 4 is journally mounted to the axle 2 preferably between the wheel 7 and the corresponding shackle 11 as shown in Figs. 1 and 4. The other end of each connecting rod 4 is attached to a transverse shaft 22 and is retained in place by suitable means, such as a cotter pin 23. The shaft 22 is slidably disposed against the undersurface of the frame 1 by a pair of shaft-retaining brackets 24 on opposite sides of the frame (Figs. 2 and 3). Each bracket 24 is retained in position by bolts 25 and is provided with a longitudinal slot 26 through which the shaft 22 slides. The length of the slot 26 corresponds to the distance through which the frame 1 must move longitudinally during the vertical movement of the frame between the positions shown in Figs. 2 and 3. Accordingly, when the frame 1 is in the lowermost position (Fig. 2), the shaft 22 is located at the end of the slot 26 nearer the front of the trailer; and when the frame 1 is in the uppermost position (Fig. 3), the shaft is located at the end of the slot 26 nearer the rear of the trailer.

In addition, the trailer is provided with a latch mechanism including a pair of latch plates 27 which are pivotally mounted separately on opposite sides of the frame 1 by means of pivot bolts 28. Both plates are provided with a shaft-engaging notch 29 (Fig. 8) and an inclined edge 30 which engages the transverse shaft 22 by gravity as it moves across the slot 26. In addition, each latch plate 27 is provided with an aperture 31 that is alignable with an aperture of similar size in the frame 1 (Fig. 7) for the insertion of a retaining pin 32.

Each plate 27 is also provided with a shock absorbing means generally indicated at 33 (Fig. 8) which includes a shaft 34 having a collar 35 secured thereto and which also includes a coil spring 36 surrounding the shaft. The shaft 34 is slidable within a pair of brackets 37 and 38 at opposite ends of the spring 36, the brackets 37 and 38 sustaining the shaft 34 in alignment with the axis of the connecting rod 4, as shown in Fig. 3. To the end of the shaft 34 adjacent the shaft-engaging notch 29 is secured a contact member 39 having a curved surface substantially corresponding to that of the shaft 22 for engagement therewith in order to retain the shaft 22 in spring suspension position when it is located at the rear end of the slot 26. In this position the shaft 22 is prevented from sustaining continuous contact with the notch 29 of the unyielding plate 27.

Another embodiment of the invention is shown in Figs. 5 and 6 in which the trailer is provided with a pair of wheels 7 having no brakes. In all other respects this embodiment corresponds to that shown in Figs. 1–4, except that the key 17 is removed so that the axle 2 is rotatable in the shackles 11. In place of brakes, this embodiment of the invention is provided with a pair of calk blocks 41.

Both embodiments of the invention are provided with a pair of drop support members 42 (Figs. 3 and 6) which are secured to the undersurface on opposite sides of the frame 1 for the purpose of contacting the axle 2 when the trailer is in the lowermost position as shown in Fig. 2. In this position the drop support members 42 prevent the axle 2 from contacting the frame member 1 directly and thereby prevent the center of the shaft 12 from dropping below the center of the axle 2. With the center of the shaft 12 slightly above the center of the axle 2 (Fig. 2), it is not possible to lock the shaft behind the axle when raising the frame 1.

As was indicated above, the trailer is raised and lowered between the positions shown in Figs. 2 and 3 by means of the automobile or vehicle (not shown) to which the trailer is attached at the forward end by the socket 6. To raise the trailer frame 1 from the lowermost position of Fig. 2, the operator applies the brakes 8 to the trailer wheels 7 and pulls the trailer forward by the automobile. This causes the shaft 12 to rotate within the journals 14 while moving through an arc from the position behind the axle 2 (Fig. 2) to the position above the axle (Fig. 3). Simultaneously, the axle 2 turns because it is keyed to the shackles 11; and the wheels 7 roll forward because the brakes 8 are applied to the wheels. Once the frame 1 reaches the upper position, any further forward movement of the trailer will cause the wheels 7 to skid rather than roll until the brakes 8 are released.

During this operation the transverse shaft 22 moves to the rear of the slot 26 in sliding contact with the inclined edges 30 of the latch plates 27 which rotate upwardly about their pivot bolts 28. When the shaft 22 reaches said rear position, the latch plates 27 drop into the locking position (Fig. 3) where it may be retained in place by means of a retaining pin 32.

After the trailer frame 1 is locked in the raised position, the trailer brakes 8 may be released and the automobile may proceed towing the trailer to its destination. When the trailer is to be unloaded, the reverse procedure is followed. The brakes 8 are applied to the wheels 7, the latch plates 27 are raised manually to the upper dotted position as shown in Fig. 3 to unlock the transverse shaft 22. The automobile then moves backwardly a sufficient distance to permit the trailer frame 1 to be lowered to a position shown in Fig. 2. In this position, the trailer is best adapted for unloading and loading heavy or bulky objects.

In the event the embodiment of the trailer shown in Figs. 5 and 6 is used (there being no brakes on the wheels 7), the calk blocks 41 are placed under the wheels 7 to prevent forward rolling of the wheels when the frame 1 is raised from the position shown in Fig. 5 to that shown in Fig. 6. Likewise, when this embodiment of the invention is to be unloaded, the calk blocks 41 are placed behind the wheels 7 (opposite the positions shown in Figs. 5 and 6) and the frame 1 is permitted to drop upon the axle 2 (Fig. 5) from the position shown in Fig. 6.

The purpose of the winch 5 is to facilitate the loading of objects onto the trailer frame 1 when necessary. In addition, the winch 5 may be used for raising the frame 1 to the upper position (Fig. 3) by extending the winch through a pulley 5a on the shaft 12 and then to the transverse shaft 22 where the winch hook 5b is secured as shown by dotted lines in Fig. 1.

From the foregoing description, it is manifest that a new and novel trailer suspension means is presented which permits the raising of a loaded trailer frame from a lower, loading position to a higher, traveling position without the exertion of human effort. The trailer is designed to make use of automotive force for raising, and lowering the frame.

In the foregoing description, certain terms have been used for brevity, clearness and understanding but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example, and the scope of the invention is not limited to the exact details illustrated and described.

Having now described the features of the invention, the construction and operation of preferred embodiments of the improved apparatus, the details of the new and useful invention, operation, apparatus, parts, elements and combinations and reasonable mechanical equivalents thereof obvious to those skilled in the arts are set forth in the amended claims.

I claim:

1. A trailer construction adapted to roll over a supporting surface, including a frame, an axle having wheel-supporting portions, wheels on the axle, resilient means mounting the frame on the axle, one end of the means being rotatably secured to the frame and the other end being fixedly secured to the axle, at least one connecting rod journally mounted at one end to the axle, the other end of the rod being mounted on the frame and slidable between a locked position and an unlocked position, a latch on the frame releasably securing the end of the rod in the locked position and having an inclined edge yieldingly contacting the end of the rod upon moving from the unlocked to the locked position, the frame being movable between upper and lower positions corresponding to the locked and unlocked positions of the rod respectively with respect to the axle, brake means on the axle releasably securing the wheels against rotation on the axle, and so constructed that the wheels roll a limited distance over their supporting surface upon raising and lowering the frame.

2. A trailer construction adapted to roll over a supporting surface including a frame, an axle having wheel-supporting portions, wheels mounted on the axle, coil springs mounting the frame on the axle, one end of the springs being rotatably secured to the frame and the other ends being fixedly secured to the axle, spring-reinforcing telescopic members with each spring having remote ends operatively connected to the axle and to the frame, connecting rods journally mounted at one end to the axle, the other end of the rods being mounted on the frame and slidable between locked and unlocked positions, the frame being movable between upper and lower positions corresponding to the locked and unlocked positions of the rods respectively with respect to the axle, brakes on the axle releasably securing the wheels against rotation on the axle, and so constructed that the wheels roll a limited distance over their supporting surface upon raising and lowering the frame.

References Cited in the file of this patent

UNITED STATES PATENTS

| | | |
|---|---|---|
| 1,100,350 | Brown | June 16, 1914 |
| 2,537,907 | Paulson | Jan. 9, 1951 |
| 2,570,528 | Davis | Oct. 9, 1951 |